(12) United States Patent
Krohn

(10) Patent No.: US 6,509,389 B1
(45) Date of Patent: Jan. 21, 2003

(54) UV CURABLE COMPOSITIONS FOR PRODUCING MAR RESISTANT COATINGS AND METHOD FOR DEPOSITING SAME

(75) Inventor: Roy C. Krohn, Fort Gratiot, MI (US)

(73) Assignee: UV Specialties, Inc., Fort Gratiot, MI (US)

( * ) Notice: Subject to any disclaimer, the term of this patent is extended or adjusted under 35 U.S.C. 154(b) by 0 days.

(21) Appl. No.: 09/668,997

(22) Filed: Sep. 25, 2000

Related U.S. Application Data
(60) Provisional application No. 60/164,073, filed on Nov. 5, 1999.

(51) Int. Cl.$^7$ ............................. C08F 2/48; C08F 2/50
(52) U.S. Cl. ..................... 522/92; 522/96; 522/100; 522/109; 522/110; 522/111; 522/24; 522/7; 522/8; 522/12; 522/31; 252/600
(58) Field of Search ..................... 522/92, 96, 100, 522/103, 109, 110, 111, 7, 8, 12, 24, 31; 252/600

(56) References Cited

U.S. PATENT DOCUMENTS

| | | | |
|---|---|---|---|
| 3,968,056 A | 7/1976 | Bolon et al. | |
| 3,988,647 A | 10/1976 | Bolon et al. | |
| 4,049,844 A | 9/1977 | Bolon et al. | |
| 4,088,801 A | 5/1978 | Bolon et al. | |
| 4,188,449 A | 2/1980 | Lu et al. | |
| RE30,274 E | 5/1980 | Bolon et al. | |
| RE31,411 E | 10/1983 | Bolon et al. | |
| 4,439,494 A | 3/1984 | Olson | |
| 4,455,205 A | 6/1984 | Olson et al. | |
| 4,478,876 A | 10/1984 | Chung | |
| 4,496,475 A | 1/1985 | Abrams | |
| 4,533,455 A | * 8/1985 | Orio ........................ 204/159.16 |
| 4,557,975 A | 12/1985 | Moore | |
| 4,594,315 A | 6/1986 | Shibue et al. | |
| 4,609,612 A | * 9/1986 | Berner et al. ............... 430/281 |
| 4,640,981 A | 2/1987 | Dery et al. | |
| 4,666,821 A | * 5/1987 | Hein et al. ................. 430/311 |
| 4,828,758 A | 5/1989 | Gillberg-LaForce et al. | |
| 4,900,763 A | 2/1990 | Kraushaar | |
| 4,911,796 A | 3/1990 | Reed | |
| 4,959,178 A | 9/1990 | Frentzel et al. | |
| 4,960,614 A | 10/1990 | Durand | |
| 4,964,948 A | 10/1990 | Reed | |
| 5,006,397 A | 4/1991 | Durand | |
| 5,049,480 A | 9/1991 | Nebe et al. | |
| 5,068,714 A | 11/1991 | Seipler | |
| 5,104,929 A | 4/1992 | Bilkadi | |
| 5,116,639 A | 5/1992 | Kolk et al. | |
| 5,128,387 A | * 7/1992 | Shustack ..................... 522/92 |
| 5,149,971 A | 9/1992 | McElhaney et al. | |
| 5,180,523 A | 1/1993 | Durand et al. | |
| 5,183,831 A | * 2/1993 | Bielat et al. .................. 522/33 |
| 5,225,170 A | 7/1993 | Kolk et al. | |
| 5,326,636 A | 7/1994 | Durand et al. | |
| 5,384,160 A | 1/1995 | Frazzitta | |
| 5,395,876 A | 3/1995 | Frentzel et al. | |
| 5,424,182 A | 6/1995 | Marginean, Sr. et al. | |
| 5,453,451 A | 9/1995 | Sokol | |
| 5,470,643 A | 11/1995 | Dorfman | |
| 5,514,214 A | 5/1996 | Joel et al. | |
| 5,587,433 A | 12/1996 | Boeckeler | |
| 5,750,186 A | 5/1998 | Frazzitta | |
| 5,773,487 A | 6/1998 | Sokol | |
| 5,784,197 A | 7/1998 | Frey et al. | |
| 5,837,745 A | 11/1998 | Safta et al. | |
| 5,866,628 A | 2/1999 | Likavec et al. | |
| 5,914,162 A | 6/1999 | Bilkadi | |
| 5,994,424 A | 11/1999 | Safta et al. | |
| 6,211,262 B1 | * 4/2001 | Mejiritski .................... 522/71 |
| 6,261,645 B1 | * 7/2001 | Betz et al. .................. 427/500 |

FOREIGN PATENT DOCUMENTS

| | | |
|---|---|---|
| EP | 0 081 323 A1 | 6/1983 |
| EP | 0 820 217 A1 | 1/1998 |

OTHER PUBLICATIONS

XP002140476, English language abstract for JP 05 311103 A, published Nov. 22, 1993, Tanaka Kikinzoku Kogyo KK.
XP002140477, English language abstract for JP 06 016721 A, published Jan. 25, 1994, Nippon Kayaku KK.

* cited by examiner

Primary Examiner—Nathan M. Nutter
Assistant Examiner—Sanza L. McClendon
(74) Attorney, Agent, or Firm—Brooks & Kushman, P.C.

(57) ABSTRACT

The present invention discloses an ultraviolet light curable mar resistant composition and method for making such a composition that may be used to produce an mar resistant layer. The disclosed composition does not contain any significant amount of volatile organic solvents that do not become incorporated in the active layer after curing.

11 Claims, No Drawings

UV CURABLE COMPOSITIONS FOR PRODUCING MAR RESISTANT COATINGS AND METHOD FOR DEPOSITING SAME

CROSS-REFERENCE TO RELATED APPLICATION

This application claims the benefit of U.S. provisional patent application Serial No. 60/164,073, filed Nov. 5, 1999, and is related to U.S. patent application Ser. No. 09/413,577, filed Oct. 6, 1999 and to U.S. patent application Ser. No. 09/669,055, filed Sep. 25, 2000.

TECHNICAL FIELD

The present invention relates to ultraviolet light curable compositions capable of producing a mar resistant coating on a substrate.

BACKGROUND OF THE INVENTION

Mar resistant coatings are thin film coatings that resist smudging and scratching. These coatings typically have a textured or matt appearance. Mar resistant coatings find utility in many graphics applications, i.e. labeling and detailing. Additionally, mar resistant coatings are applied to wood surfaces to enhance abrasion and chemical resistance without compromising the quality of the underlying wood finish.

Such coatings have previously been formed from compositions of thermoplastic coating material such as thermoplastic, (meth)acrylic or (meth)acrylic-styrene copolymer emulsions. These compositions are applied to the substrate during wet-trap, off-line dry-trap, gravure, offset, silk-screen, flexography and related printing and coating processes. Once applied, the compositions provide superior film characteristics which include high gloss, mar resistance and oil and water resistance. These film characteristics are a function of composition weight and the percentage of solids in the composition. In general, high weight and high solid content correlate to superior film characteristics.

In order to achieve high weight and solid content, high quantities of volatile organic compounds (VOCs) are added to thermosetting compositions. These VOCs do not incorporate into the final coating after curing. Instead, the VOCs escape into the ambient. Once introduced into the environment, VOCs pose substantial hazards associated with inhalation. Such thermosetting solvent based systems are undesirable because of the hazards and expenses associated with VOCs.

UV curable compositions which do not contain VOCs are known in the art. UV compositions are cured through rapid photo-induced polymerizations instead of thermal energy which releases VOCs into the atmosphere. Since the UV curing process is essentially solvent free, the necessity for time consuming and expensive pollution abatement procedures is greatly reduced.

UV curable mar resistant coatings offer several other benefits not associated with thermally cured coatings. First, faster cure times offer substantial economic benefits. Furthermore, heat sensitive materials can be safely coated and cured with UV light without thermal degradation of the heat sensitive substrate. Additionally, UV light is a relatively low cost source of energy due to its widespread availability.

Although UV curable mar resistant coatings are superior to their thermal counterparts, there are still disadvantages inherent in UV curable coatings. Since UV curable mar resistant coatings require compositions which have high molecular weight and viscosity, it is difficult to apply the composition through spraying and brushing. Additionally, many UV curable mar resistant coatings require compositions that are prone to dispersion and instability. By using these compositions, the curing results in an uneven and blemished coating.

Accordingly, there exists a need to provide environmentally safe UV curable mar resistant coatings which exhibit an improved finish and resistance to smudging and scratching. Additionally, there is a need to provide a method of applying the coatings which furthers the goal of improved performance.

SUMMARY OF INVENTION

It is an object of the present invention to provide an improved composition that upon curing by ultraviolet light produces a coating that is mar resistant.

It is another object of the present invention to provide an improved composition that upon curing by ultraviolet light produce a textured coating that is mar resistant.

It is another object of the present invention to provide an improved composition that can be applied by spraying, screen printing, dipping, and brushing.

The present invention discloses an ultraviolet light curable mar resistant composition and method for depositing such a composition to produce a mar resistant layer. The disclosed composition does not contain any significant amount of volatile organic solvents that do not become incorporated in the mar resistant layer after curing. Specifically, the mar resistant composition contains 5% or less volatile organic solvents by weight.

In accordance with one aspect of the invention, an ultraviolet light curable mar resistant composition is provided. The mar resistant composition comprises a mixture of one or more aliphatic acrylated oligomers, wherein the aliphatic acrylated oligomer mixture is present in an amount of about 2% to 40% of the mar resistant composition. All percentages of the mar resistant composition as expressed in this document refer to the weight percentage of the stated component to the total weight of the mar resistant composition.

The mar resistant composition preferably comprises an acrylated epoxy oligomer in an amount of about 2% to 10%, an isobornyl acrylate monomer in an amount of about 15% to 50% of the mar resistant composition, a photoinitiator in an amount of about 2% to 8% of the mar resistant composition, and a talc in an amount of about 25% to 45% of the mar resistant composition.

In accordance with yet another aspect of the invention, a method is provided for depositing a mar resistant coating on a substrate. The method comprises a first step of applying to the substrate a mar resistant fluid-phase composition ("mar resistant composition"). The mar resistant composition comprises a mixture of aliphatic acrylated oligomers, wherein the aliphatic acrylated oligomer is present in an amount of about 2% to 40% of the mar resistant composition. The mar resistant composition also includes an acrylated epoxy oligomer in an amount of about 2% to 10%, an isobornyl acrylate monomer in an amount of about 15% to 50% of the mar resistant composition, a photoinitiator in an amount of about 2% to 8% of the mar resistant composition, and a talc in an amount of about 25% to 45% of the mar resistant composition.

The method also includes a second step of illuminating the mar resistant composition on the substrate with an ultraviolet light to cause the mar resistant composition to cure into the mar resistant coating.

In accordance with this method, the mar resistant composition can be selectively deposited on the substrate at specific locations where mar resistant plating is desired. The mar resistant composition need not be applied to the entire substrate.

BEST MODE FOR CARRYING OUT THE INVENTION

Mar Resistant Compositions

Reference will now be made in detail to presently preferred compositions or embodiments and methods of the invention, which constitute the best modes of practicing the invention presently known to the inventor.

In accordance with one aspect of the invention, a presently preferred ultraviolet light curable mar resistant composition ("mar resistant composition") is provided. In this preferred embodiment, the mar resistant composition includes a mixture of aliphatic acrylated oligomers. The aliphatic acrylated oligomer mixture is present in an amount of about 2% to 40% of the mar resistant composition. If the mar resistant composition is applied by screen printing, the aliphatic acrylated oligomer mixture is more preferably present in an amount of about 28% to 38%, and most preferably about 32%. If the mar resistant composition is applied by flexographic techniques, the aliphatic acrylated oligomer mixture is more preferably present in an amount of about 22% to 32%, and most preferably about 27%. However, if the mar resistant composition is applied by flexographic techniques and contains an optional flow promoting agent as described below, the aliphatic acrylated oligomer mixture is more preferably present in an amount of about 2% to 8%, and most preferably about 5%. The aliphatic acrylated oligomer preferably comprises one or more urethane oligomers. Suitable aliphatic acrylated oligomers include Radcure Ebecryl 244 (aliphatic urethane diacrylate diluted 10% with 1,6-hexanediol diacrylate), Ebecryl 264 (aliphatic urethane triacrylate diluted 15% with 1,6-hexanediol diacrylate), Ebecryl 284 (aliphatic urethane diacrylate diluted 10% with 1,6-hexanediol diacrylate), commercially available from Radcure UCB Corp. of Smyrna, Ga.; Sartomer CN-961E75 (aliphatic urethane diacrylate blended with 25% ethoxylated trimethylol propane triacylate), CN-961H81 (aliphatic urethane diacrylate blended with 19% 2(2-ethoxyethoxy)ethyl acrylate), CN-963A80 (aliphatic urethane diacrylate blended with 20% tripropylene glycol diacrylate), CN-964 (aliphatic urethane diacrylate), CN-966A80 (aliphatic urethane diacrylate blended with 20% tripropylene glycol diacrylate), CN-982A75 (aliphatic urethane diacrylate blended with 25% tripropylene glycol diacrylate) and CN-983 (aliphatic urethane diacrylate), commercially available from Sartomer Corp. of Exton, Pa.; TAB FAIRAD 8010, 8179, 8205, 8210, 8216, 8264, M-E-15, UVU-316, commercially available from TAB Chemicals of Chicago, Ill.; and Echo Resin ALU-303, commercially available from Echo Resins of Versaille, Mo.; and Genomer 4652, commercially available from Rahn Radiation Curing of Aurora, Ill. The preferred aliphatic acrylated oligomers include Ebecryl 264 and Ebecryl 284. Ebecryl 264 is an aliphatic urethane triacrylate of 1200 molecular weight supplied as an 85% solution in 1,6-hexanediol diacrylate. Ebecryl 284 is aliphatic urethane diacrylate of 1200 molecular weight diluted 10% with 1,6-hexanediol diacrylate. Combinations of these materials may also be employed herein.

This preferred mar resistant composition further includes an acrylated epoxy oligomer. The acrylated epoxy oligomer is present in an amount of about 2% to 10%. If the mar resistant composition is applied by screen printing, the acrylated epoxy oligomer is more preferably present in an amount of about 3% to 6%, and most preferably about 4%. If the mar resistant composition is applied by flexographic techniques, the acrylated epoxy oligomer is more preferably present in an amount of about 3% to 6%, and most preferably about 4%. Suitable acrylated epoxy oligomers include Radcure Ebecryl 3603 (novolac epoxy acrylate diluted 20% with tripropylene glycol diacrylate), commercially available from Radcure UCB Corp.; Sartomer CN120 (difunctional bisphenol based epoxy acrylate) and CN124 (difunctional bisphenol based epoxy acrylate), commercially available from Sartomer Corp.; and Echo Resin TME 9310 and 9345, commercially available from Echo Resins. The preferred acrylated epoxy oligomer is Ebecryl 3603, which trifunctional acrylated epoxy novolac. Combinations of these materials may also be employed herein.

The preferred mar resistant composition also includes an isobornyl acrylate monomer in an amount of about 15% to 50%. If the mar resistant composition is applied by screen printing, the isobornyl acrylate monomer is more preferably present in an amount of about 15% to 25%, and most preferably about 20%. If the mar resistant composition is applied by flexographic techniques, the isobornyl acrylate monomer is more preferably present in an amount of about 28% to 38%, and most preferably about 33%. However, if the mar resistant composition is applied by flexographic techniques and contains an optional flow promoting agent as described below, the isobornyl acrylate monomer is more preferably present in an amount of about 38% to 48%, and most preferably about 43%. Suitable isobornyl acrylate monomers include Sartomer SR423 (isobornyl methacrylate):

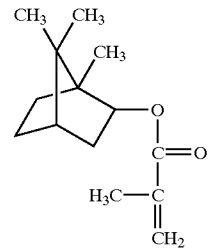

and SR506 (isobornyl acrylate):

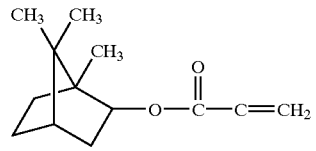

available from Sartomer Corp.; Radcure IBOA (isobornyl acrylate), commercially available from Radcure Corp.; IBOA and IBOMA, commercially available from CPS Chemical of Bradford, England; and Genomer 1121, commercially available from Rahn Radiation Curing. The preferred isobornyl acrylate monomer is Radcure IBOA, commercially available from Radcure Corp. Radcure EBOA is a high purity, low color monomer. Combinations of these materials may also be employed herein.

This preferred mar resistant composition also includes a photoinitiator in an amount of about 2% to 8% of the mar resistant composition. If the mar resistant composition is applied by screen printing, the photoinitiator is more preferably present in an amount of about 3% to 7%, and most preferably about 5%. If the mar resistant composition is applied by flexographic techniques, the photoinitiator is more preferably present in an amount of about 2% to 6%, and most preferably about 4%. Suitable photoinitiators include Irgacure 184 (1-hydroxycyclohexyl phenyl ketone):

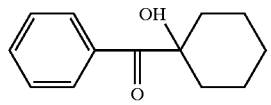

Irgacure 907 (2-methyl-1-[4-(methylthio)phenyl]-2-morpholino propan-1-one):

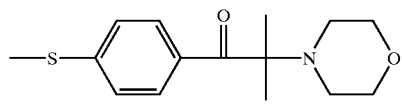

Irgacure 369 (2-benzyl-2-N,N-dimethylamino-1-(4-morpholinophenyl)-1-butanone):

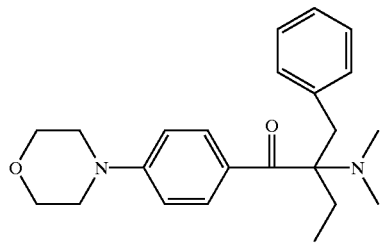

Irgacure 500 (the combination of 50% 1-hydroxy cyclohexyl phenyl ketone:

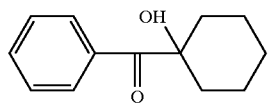

and 50% benzophenone),

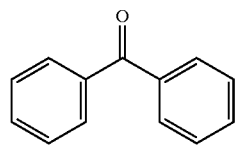

Irgacure 651 (2,2-dimethoxy-1,2-diphenylethan-1-one):

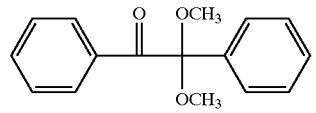

Irgacure 1700 (the combination of 25% bis(2,6-dimethoxybenzoyl-2,4-,4-trimethyl pentyl) phosphine oxide:

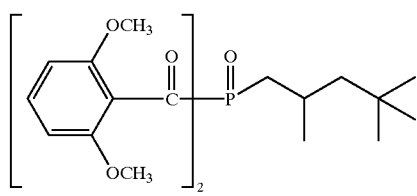

and 75% 2-hydroxy-2-methyl-1-phenyl-propan-1-one):

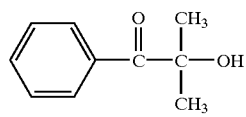

DAROCUR 1173 (2-hydroxy-2-methyl-1phenyl-1-propane):

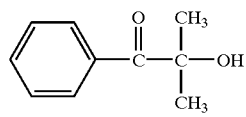

and DAROCUR 4265 (the combination of 50% 2,4,6-trimethylbenzoyldiphenyl-phosphine oxide:

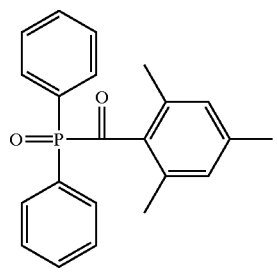

and 50% 2-hydroxy 2-methyl-1-phenyl-propan-1-one):

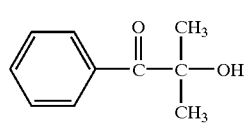

available commercially from Ciba-Geigy Corp., Tarrytown, N.Y.; CYRACURE UVI-6974 (mixed triaryl sulfonium hexafluoroantimonate salts) and CYRACURE UVI-6990 (mixed triaryl sulfonium hexafluorophosphate salts) available commercially from Union Carbide Chemicals and Plastics Co. Inc., Danbury, Conn.; and Genocure CQ, Genocure BOK, and Genocure M. F., commercially available from Rahn Radiation Curing. The preferred photoinitiator is Irgacure 1700 commercially available from Ciba-Geigy of Tarrytown, N.Y. Combinations of these materials may also be employed herein.

This preferred mar resistant composition also includes a talc in an amount of about 25% to 45% of the mar resistant composition. If the mar resistant composition is applied by screen printing, the talc is more preferably present in an amount of about 35% to 45%, and most preferably about 39%. If the mar resistant composition is applied by flexographic techniques, the talc is more preferably present in an amount of about 28% to 38%, and most preferably about 33%. Suitable talcs include Talc #400 and Talc #600 (now called Jetfil 575P) commercially available from Luzenac of Englewood, Colo.

The preferred mar resistant composition still further optionally includes a flow promoting agent in an amount of about 0.0% to 15% of the mar resistant composition. The flow promoting agent is more preferably present in an amount of about 7% to 13%, and most preferably about 10%. Suitable flow promoting agents include Genorad 17, commercially available from Rahn Radiation Curing; and Modaflow, commercially available from Monsanto Chemical Co., St. Louis, Mo. The preferred flow promoting agent is Modaflow which is an ethyl acrylate and 2-ethylhexyl acrylate copolymer that improves the flow of the composition. Combinations of these materials may also be employed herein.

To illustrate, the following example sets forth a presently preferred mar resistant composition according to this aspect of the invention.

EXAMPLE 1

This example provides a preferred mar resistant composition according to the invention that can be applied to a substrate by flexographic techniques. The mar resistant composition was made from the following components:

| Component | Approximate Weight % |
| --- | --- |
| Ebecryl 264 | 13.6 |
| Ebecryl 284 | 13.6 |
| IBOA | 32.2 |
| Irgacure 1700 | 4.1 |
| Ebecryl 3603 | 3.5 |
| Mistron talc | 33.0 |
| Total | 100.00 |

In this example the IBOA and Irgacure 1700 are mixed in a pan with a propeller blade mixer for 30 seconds at a speed of 500 to 1000 rpm. In the next step, the Ebecryl 264, the Ebecryl 284, and the Ebecryl 3603 are introduced into the pan and mixed for 1 to 2 minutes at a speed of 2000 rpm. In the final step, the talc is introduced into the pan and mixed for 1 to 2 minutes at a speed of 5000 rpm. The temperature during mixing is monitored. The mixing is temporarily suspended if the temperature exceed 100° F.

EXAMPLE 2

This example provides a preferred mar resistant composition according to the invention that can be applied to a substrate by screen printing techniques. The mar resistant composition was made from the following components:

| Component | Approximate Weight % |
| --- | --- |
| Ebecryl 264 | 15.9 |
| Ebecryl 284 | 15.9 |
| IBOA | 20.8 |
| Irgacure 1700 | 4.8 |
| Ebecryl 3603 | 4.1 |
| Mistron talc | 38.5 |
| Total | 100.00 |

In this example the IBOA and Irgacure 1700 are mixed in a pan with a propeller blade mixer for 30 seconds at a speed of 500 to 1000 rpm. In the next step, the Ebecryl 264, the Ebecryl 284, and the Ebecryl 3603 are introduced into the pan and mixed for 1 to 2 minutes at a speed of 2000 rpm. In the final step, the talc is introduced into the pan and mixed for 1 to 2 minutes at a speed of 5000 rpm. The temperature during mixing is monitored. The mixing is temporarily suspended if the temperature exceed 100° F.

EXAMPLE 3

This example provides a preferred mar resistant composition according to the invention that can be applied to a substrate by flexographic techniques. The mar resistant composition was made from the following components:

| Component | Approximate Weight % |
| --- | --- |
| Ebecryl 264 | 2.7 |
| Ebecryl 284 | 2.7 |
| IBOA | 42.7 |
| Irgacure 1700 | 4.9 |
| Ebecryl 3603 | 5.7 |
| Mistron talc | 31.3 |
| Modaflow | 10.0 |
| Total | 100.00 |

In this example the IBOA and Irgacure 1700 are mixed in a pan with a propeller blade mixer for 30 seconds at a speed of 500 to 1000 rpm. In the next step, the Ebecryl 264, the Ebecryl 284, the Ebecryl 3603, and the Modaflow are introduced into the pan and mixed for 1 to 2 minutes at a speed of 2000 rpm. In the final step, the talc is introduced into the pan and mixed for 1 to 2 minutes at a speed of 5000 rpm. The temperature during mixing is monitored. The mixing is temporarily suspended if the temperature exceed 100° F.

Method for Depositing a Mar Resistant Coating on a Substrate

In accordance with still another aspect of the invention, a method is provided for depositing a mar resistant coating on a suitable substrate. The method comprises a first step of applying a mar resistant fluid-phase composition ("mar resistant composition") to the substrate.

The mar resistant composition comprises an aliphatic acrylated oligomer mixture, the aliphatic acrylated oligomer mixture being present in an amount of about 2% to 40% of the mar resistant composition; an isobornyl acrylate monomer in an amount of about 15% to 50% of the mar resistant composition; an acrylated epoxy oligomer in an amount of about 2% to 10% of the mar resistant composition; a photoinitiator in an amount of about 2% to 8% of the mar resistant composition and a talc in an amount of about 25% to 45% of the mar resistant composition. The preferred mar resistant compositions according to this method are those described herein, for example, including the compositions described in examples 1 through 3.

The mar resistant composition may be applied to the substrate using a number of different techniques. The mar resistant composition may be applied, for example, by direct brush application, or it may be sprayed onto the substrate surface. It also may be applied using a screen printing technique. In such screen printing technique, a "screen" as the term is used in the screen printing industry is used to regulate the flow of liquid composition onto the substrate surface. The mar resistant composition typically would be applied to the screen as the latter contacts the substrate. The mar resistant composition flows through the silk screen to the substrate, whereupon it adheres to the substrate at the desired film thickness. Screen printing techniques suitable for this purpose include known techniques which are adjusted in ways known to persons of ordinary skill in the art to accommodate the viscosity, flowability, etc. of the liquid-phase composition and the properties of the substrate. Flexographic techniques using pinch rollers to contact the mar resistant composition with a rolling substrate, may be used.

The method includes a second step of illuminating the mar resistant fluid-phase composition on the substrate with an ultraviolet light to cause the mar resistant fluid-phase composition to cure into the mar resistant coating. This illumination may be carried out in any number of ways, provided the ultraviolet light or radiation impinges upon the mar resistant composition so that the mar resistant composition is caused to polymerize to form the coating, layer, film, etc.

Curing preferably takes place by free radical polymerization, which is initiated by an ultraviolet radiation source. Various ultraviolet light sources may be used, depending on the application. Preferred ultraviolet radiation sources for a number of applications include known ultraviolet lighting equipment with energy intensity settings of, for example, 125 watts, 200 watts, and 300 watts per square inch.

Additional advantages and modifications will readily occur to those skilled in the art. Therefore, the invention in its broader aspects is not limited to the specific details, representative devices, and illustrative examples shown and described. Accordingly, departures may be made from such details without departing from the spirit or scope of the general inventive concept.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An ultraviolet (UV) curable mar resistant composition comprising:
   a mixture of one or more aliphatic acrylated oligomers in an amount of about 2% to 40% of the weight of the mar resistant composition;
   an acrylated epoxy oligomer in an amount of about 2% to 10% of the weight of the mar resistant composition;
   an isobornyl acrylate monomer in an amount of about 15% to 50% of the weight of the mar resistant composition;
   a talc in an amount of about 25% to 45% of the weight of the mar resistant composition; and
   a photoinitiator in an amount of about 2% to 8% of the weight of the mar resistant composition;
   wherein the ultraviolet curable mar resistant composition is curable into a coating that resists scratching and smudging and does not contain any significant amount of volatile organic solvents that do not become incorporated in the coating after the composition is cured.

2. The mar resistant composition as set forth in claim 1 wherein the aliphatic acrylate oligomer is selected from the group consisting of:
   aliphatic urethane diacrylate diluted 10% with 1,6-hexanediol diacrylate;
   aliphatic urethane triacrylate diluted 15% with 1,6-hexanediol diacrylate;
   aliphatic urethane diacrylate blended with 20% tripropylene glycol diacrylate;
   aliphatic urethane diacrylate blended with 25% ethoxylated trimethylol propane triacrylate;
   aliphatic urethane diacrylate blended with 19% 2(2-ethoxyethoxy)ethyl acrylate;
   aliphatic urethane diacrylate blended with 20% tripropylene glycol diacrylate;
   aliphatic urethane diacrylate blended with 20% tripropylene glycol diacrylate;
   aliphatic urethane diacrylate blended with 25% tripropylene glycol diacrylate; and
   aliphatic urethane diacrylate;
   and mixtures thereof.

3. The ultraviolet (UV) curable mar resistant composition of claim 1, further comprising a flow promoting agent.

4. The mar resistant composition as set forth in claim 3 wherein:
   the mixture of one or more aliphatic acrylated oligomers is present in an amount of about 2% to 8% of the weight of the mar resistant composition;
   the acrylated epoxy oligomer is present in an amount of about 3% to 6% of the weight of the mar resistant composition;
   the isobornyl acrylate monomer is present in an amount of about 38% to 48% of the weight of the mar resistant composition;
   the talc is present in an amount of about 35% to 45% of the weight of the mar resistant composition;
   the photoinitiator is present in an amount of about 3% to 7% of the weight of the mar resistant composition; and
   the flow promoting agent is present in an amount of about 0.0% to 15% of the weight of the mar resistant composition.

5. The mar resistant composition as set forth in claim 1 wherein the acrylated epoxy oligomer is selected from the group consisting of trifunctional acrylated epoxy novolac, difunctional bisphenol based epoxy resin, and mixtures therefor.

6. The mar resistant composition as set forth in claim 1 wherein the isobornyl acrylate monomer is selected from the group consisting of isobornyl acrylate, isobornyl methacrylate, and mixtures thereof.

7. The mar resistant composition as set forth in claim 1 wherein the photoinitiator is selected from the group consisting of:
   1-hydroxycyclohexyl phenyl ketone;
   2-methyl-1-[4-(methylthio)phenyl]-2-morpholino propan-1-;
   the combination of 50% 1-hydroxy cyclohexyl phenyl ketone and 50% benzophenone;
   2,2-dimethoxy-1,2-diphenylethan-1-one;
   the combination of 25% bis(2,6-dimethoxybenzoyl-2,4-,4-trimethyl pentyl) phosphine oxide and 75% 2-hydroxy-2-methyl-1-phenyl-propan-1-one;

2-hydroxy-2-methyl-1-phenyl-1-propane;

the combination of 50% 2,4,6-trimethylbenzoyldiphenylphosphine oxide and 50% 2-hydroxy 2-methyl-1-phenyl-propan-1-one;

mixed triaryl sulfonium hexafluoroantimonate salts;

mixed triaryl sulfonium hexafluorophosphate salts;

and mixtures thereof.

8. The mar resistant composition as set forth in claim 1 wherein the mixture of one or more aliphatic acrylated oligomers is one or more urethane oligomers.

9. The mar resistant composition as set forth in claim 1 wherein:

the mixture of one or more aliphatic acrylated oligomers is present in an amount of about 28% to 38% of the weight of the mar resistant composition;

the acrylated epoxy oligomer is present in an amount of about 3% to 6% of the weight of the mar resistant composition;

the isobornyl acrylate monomer is present in an amount of about 15% to 25% of the weight of the mar resistant composition;

the talc is present in an amount of about 35% to 45% of the weight of the mar resistant composition; and the photoinitiator is present in an amount of about 3% to 7% of the weight of the mar resistant composition.

10. The mar resistant composition as set forth in claim 1 wherein:

the mixture of one or more aliphatic acrylated oligomers is present in an amount of about 22% to 32% of the weight of the mar resistant composition;

the acrylated epoxy oligomer is present in an amount of about 3% to 6% of the weight of the mar resistant composition;

the isobornyl acrylate monomer is present in an amount of about 28% to 38% of the weight of the mar resistant composition;

the talc is present in an amount of about 28% to 38% of the weight of the mar resistant composition; and the photoinitiator is present in an amount of about 2% to 6% of the weight of the mar resistant composition.

11. A method of preparing an ultraviolet (UV) curable mar resistant composition comprising:

combining an isobornyl acrylate monomer and a photoinitiator in a pan to form a first combination;

mixing the first combination;

combining an aliphatic acrylated oligomer mixture and an acrylated epoxy oligomer with the first mixture to form a second combination;

mixing the second combination;

combining a talc with the second mixture to form a third combination; and mixing the third combination.

* * * * *